May 2, 1933. J. D. CONEY 1,906,741
MACHINE FOR MAKING GARMENT HANGERS
Filed March 24, 1930 11 Sheets-Sheet 1

Fig. 1.

INVENTOR
James D. Coney
BY
J. S. Murray
ATTORNEY

May 2, 1933. J. D. CONEY 1,906,741
MACHINE FOR MAKING GARMENT HANGERS
Filed March 24, 1930 11 Sheets-Sheet 3

INVENTOR
James D. Coney

ATTORNEY

Fig. 6.

May 2, 1933.　　　　J. D. CONEY　　　　1,906,741
MACHINE FOR MAKING GARMENT HANGERS
Filed March 24, 1930　　11 Sheets-Sheet 6

INVENTOR
James D. Coney

BY
J. S. Murray
ATTORNEY

May 2, 1933.  J. D. CONEY  1,906,741
MACHINE FOR MAKING GARMENT HANGERS
Filed March 24, 1930   11 Sheets-Sheet 7

INVENTOR
James D. Coney
ATTORNEY

May 2, 1933. J. D. CONEY 1,906,741
MACHINE FOR MAKING GARMENT HANGERS
Filed March 24, 1930 11 Sheets-Sheet 9

Fig. 15
Fig. 16
Fig. 17

INVENTOR
James D. Coney

BY
J. S. Murray
ATTORNEY

May 2, 1933.  J. D. CONEY  1,906,741
MACHINE FOR MAKING GARMENT HANGERS
Filed March 24, 1930   11 Sheets-Sheet 11

INVENTOR
James D. Coney.
BY
J. S. Murray
ATTORNEY

Patented May 2, 1933

1,906,741

UNITED STATES PATENT OFFICE

JAMES D. CONEY, OF DETROIT, MICHIGAN

MACHINE FOR MAKING GARMENT HANGERS

Application filed March 24, 1930. Serial No. 438,476.

This invention relates to wire working machines, and particularly to machines for fashioning wire blanks into triangular hangers having integrally projecting supporting hooks.

In heretofore forming such hangers a hook shank formed by one end portion of a wire blank and the other extremity of said blank have been twisted together to connect the hanger sides. An object of the invention is to adapt a hanger of the specified character to be formed with less wire and by a simpler mechanism than in such prior practice by providing for a terminal looping of one of the sides of the hanger about the other, adjacent to the hook shank.

Another object is to form corresponding offsets in the sides of a wire hanger in the course of its formation from a blank to conform said hanger more accurately to the collar portion of a supported coat.

A further object is to increase the rate of production of a machine of the described character by adapting said machine to concurrently connect the end portions of the wire and form a supporting hook on one thereof.

Still another object is to provide a simplified mechanism for rigidly connecting two parts of a wire or wires through looping one of said parts one or more times about the other.

A still further object is to provide an improved arrangement of cams for accurately timing the consecutive concurrent operations involved in forming a wire garment hanger.

Additional objects are to provide improved means for feeding wire blanks continuously and automatically to fashioning instrumentalities, for ejecting completed hangers from the machine, and for temporarily supporting such hangers upon the machine.

These and various other objects the invention attains by the construction hereinafter described and illustrated in the accompanying drawings, wherein.

*Frame, main shafts and cams, and drive means. (Figs. 1–10 and 12)*

In these views, the reference character 1 designates a table member, preferably metallic, supported in any manner at a convenient elevation, as by a pedestal 2. Adjacent to and coextensive with its front and rear margins, said member rigidly carries a pair of upright mounting plates 3 and 4, journaling the shafts and supporting various other parts of the machine. The central upper portion of the plate 2 rigidly carries a shaft 5 projecting rearwardly, and journaling a pulley 6, driven through a belt 7 from a motor or the like, not shown. Said shaft further journals a pinion 8 between which and the pulley 6 a clutch member 9 slides on said shaft to establish or break a drive connection. The clutch comprising the member 9 may have any suitable construction and is controlled by any suitable mechanism.

The pinion 8 drives a pair of gears 10, (see Fig. 3) one at each side thereof, fast on shafts 11 and 12 journaled in the upper portions of the plates 3 and 4. Fast on the shaft 11 between said plates are cams 13, 14 and 15, and another cam 16 is fast on the rear end portion of said shaft. (See Figs. 2 and 5). The shaft 12 rigidly carries a cam 17, preferably opposite to the cam. (See Figs. 2 and 6).

*Blank hopper and feed mechanism (see Figs. 1, 2, 5–8)*

The feed plate 3 is surmounted by an elongated hopper 18 for receiving hanger-forming blanks 19 consisting of straight lengths of wire. Said hopper extends transversely of the machine, its extremities projecting considerably beyond the table 1 and being supported by brackets 20 rigidly laterally projecting from the plate 3. The hopper sides are acutely downwardly convergent, their lower edges being spaced for discharge of the blanks. (See Fig. 5.)

Figure 1:
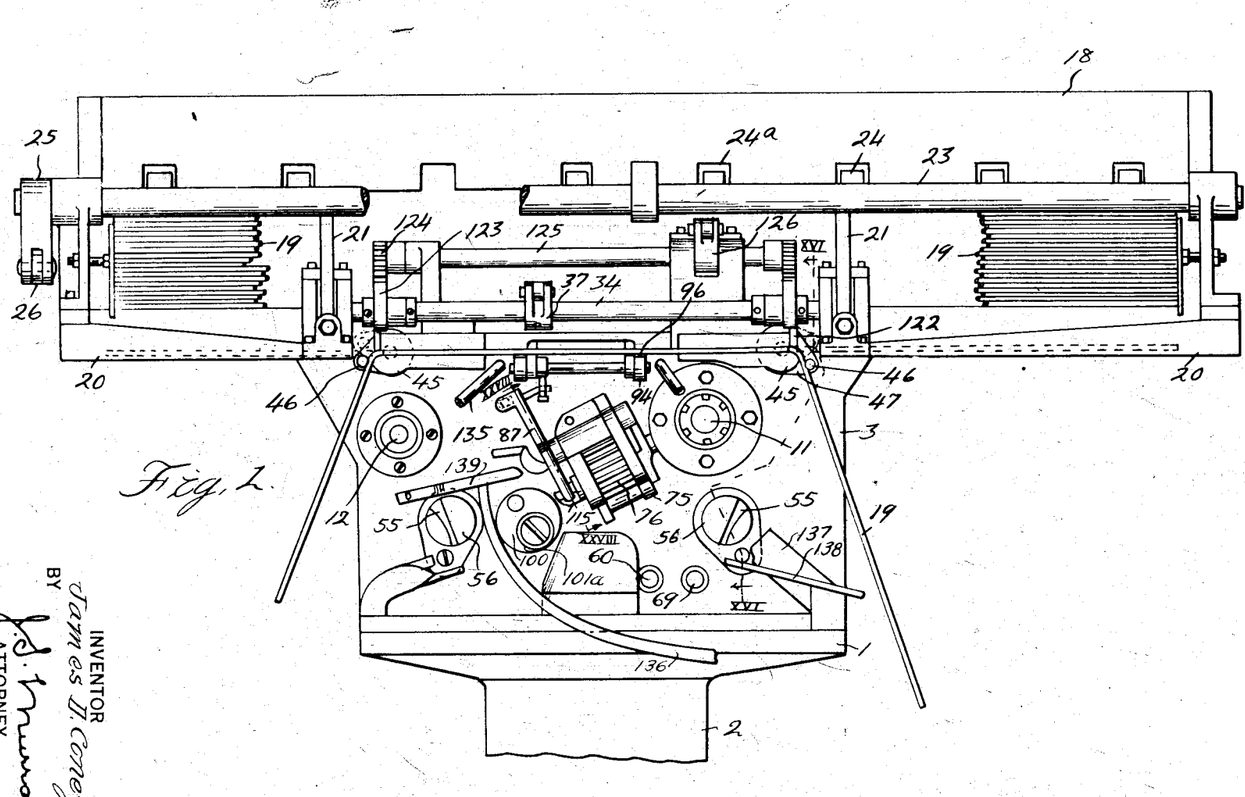
Fig. 1 is a front view of the improved hanger-forming machine, showing an initial bending operation partially completed.
Figure 2:
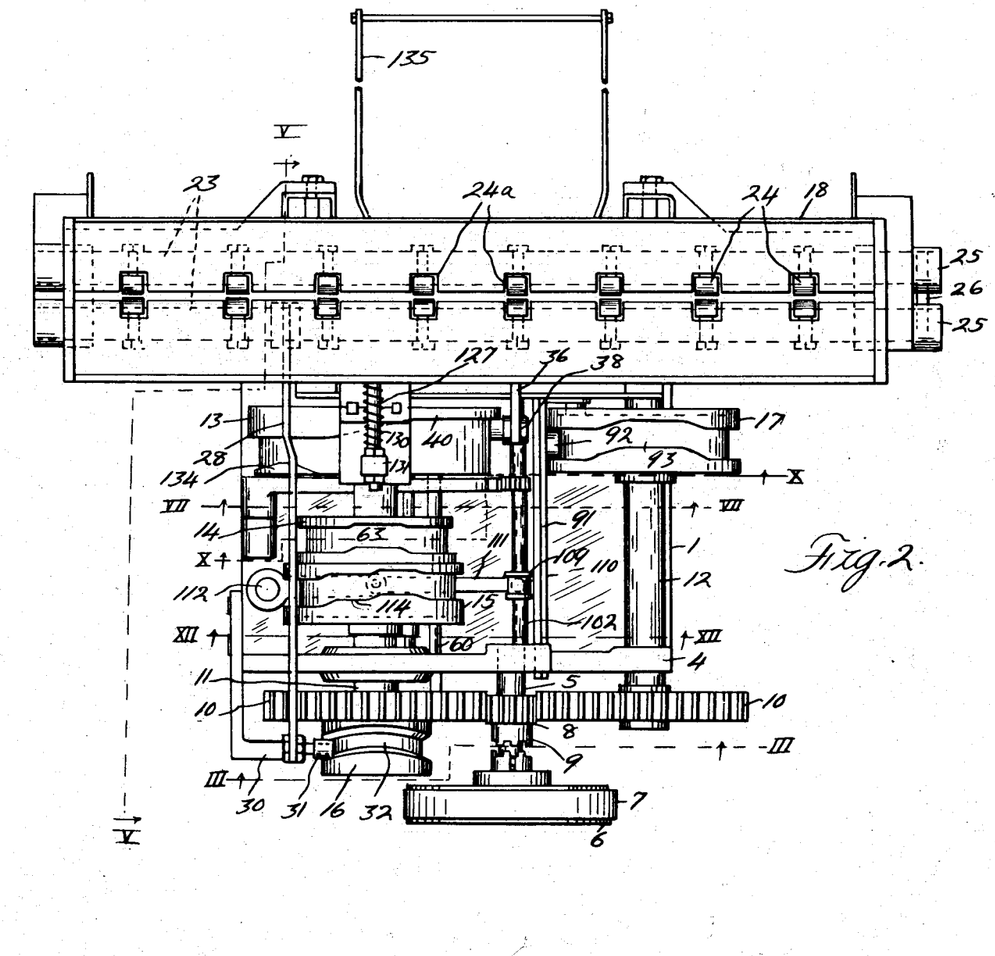
Fig. 2 is a top view of the same.
Figures 3, 15A:
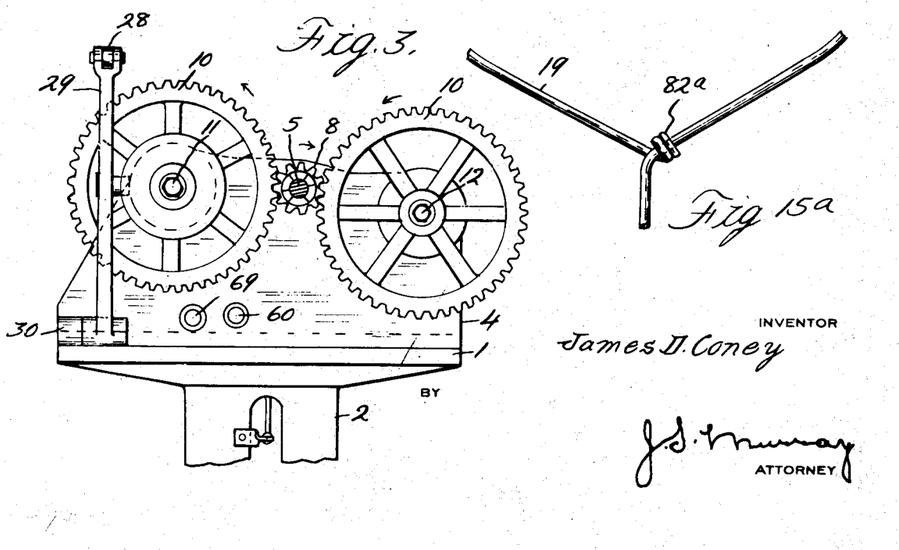
Fig. 3 is a rear view thereof with certain of the parts broken away and partly in section on the line III—III of Fig. 2.
Fig. 15a is a fragmentary, elevational view of a garment hanger formed by the machine, particularly showing a multiple looping of one of the hanger end portions about the other.
Figure 4:
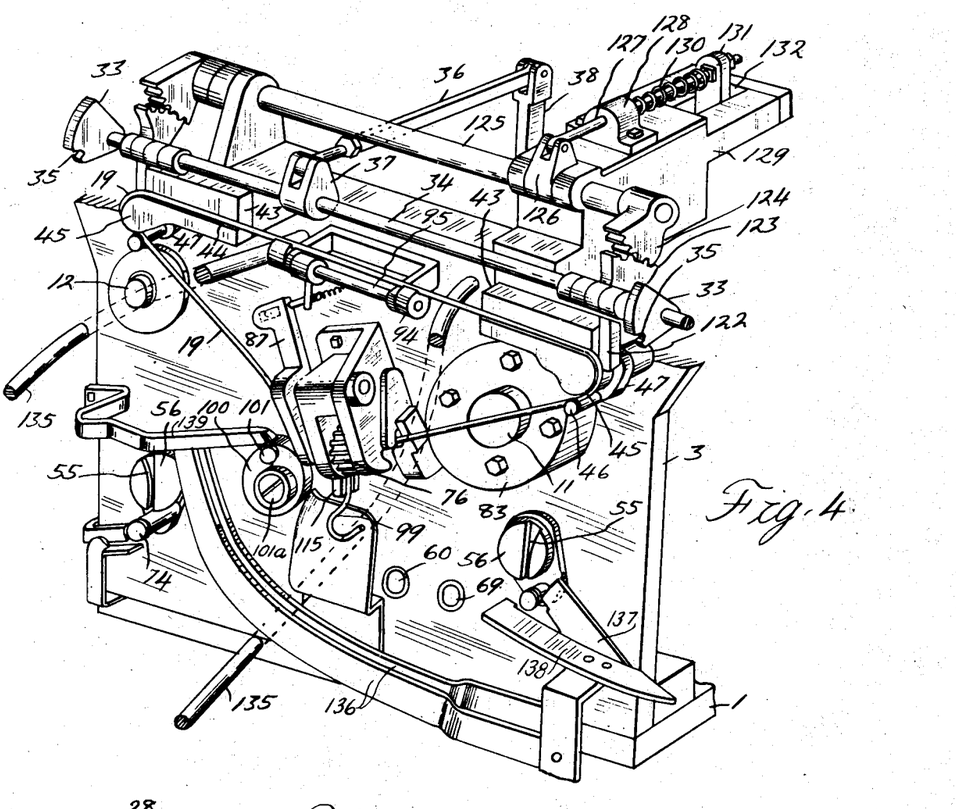
Fig. 4 is a perspective view of the front portion of the machine, omitting the hopper mechanism, and showing a hanger positioned, as at its completion.
Figures 5, 5A:
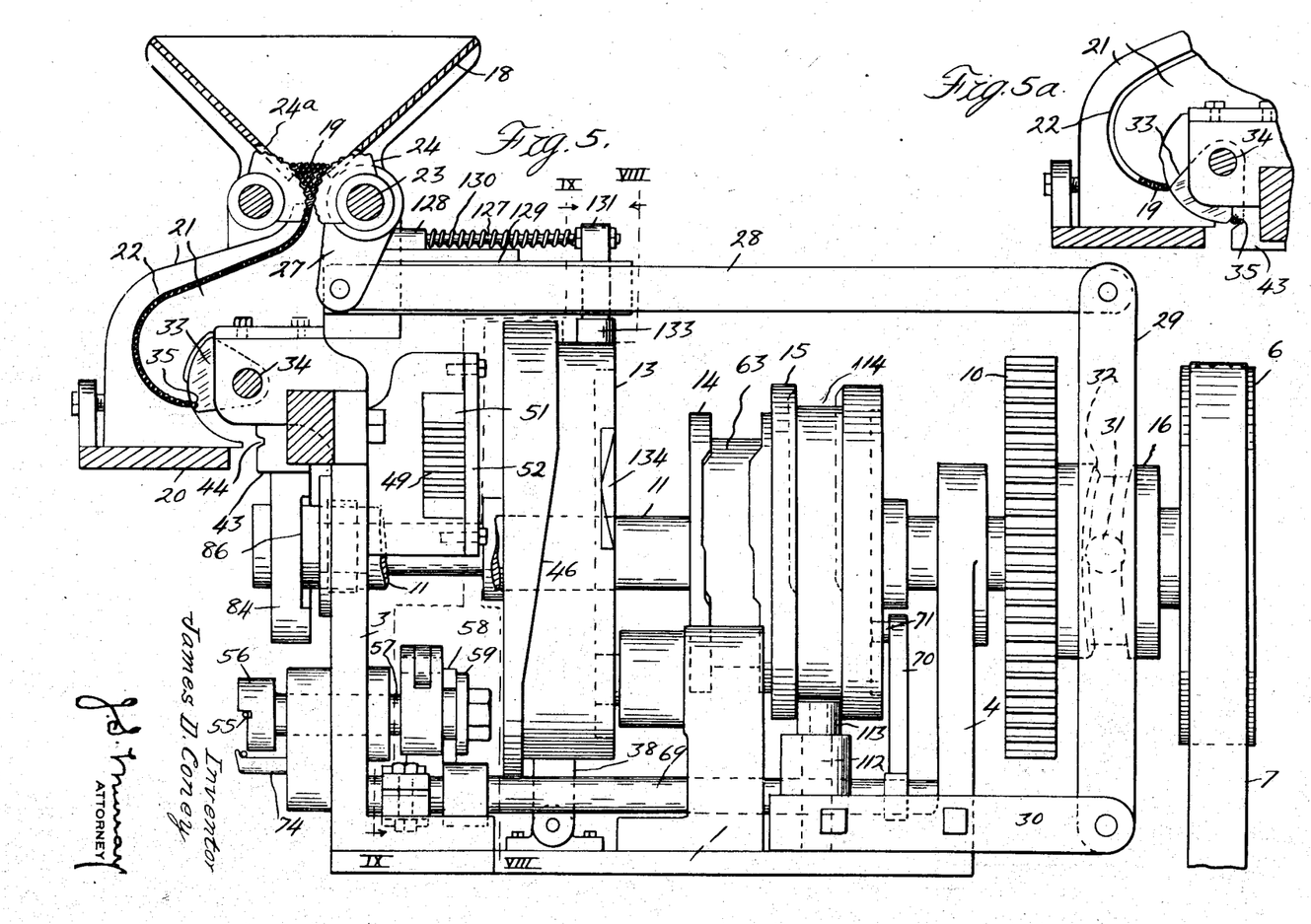
Fig. 5 is a left-side view of the machine, partially in section on the line V—V of Fig. 2, and showing the loading position of a rocking blank carrier.
Fig. 5a is a fragmentary view repeating a portion of Fig. 5 but showing the delivery position of said blank carrier.
Figure 6:
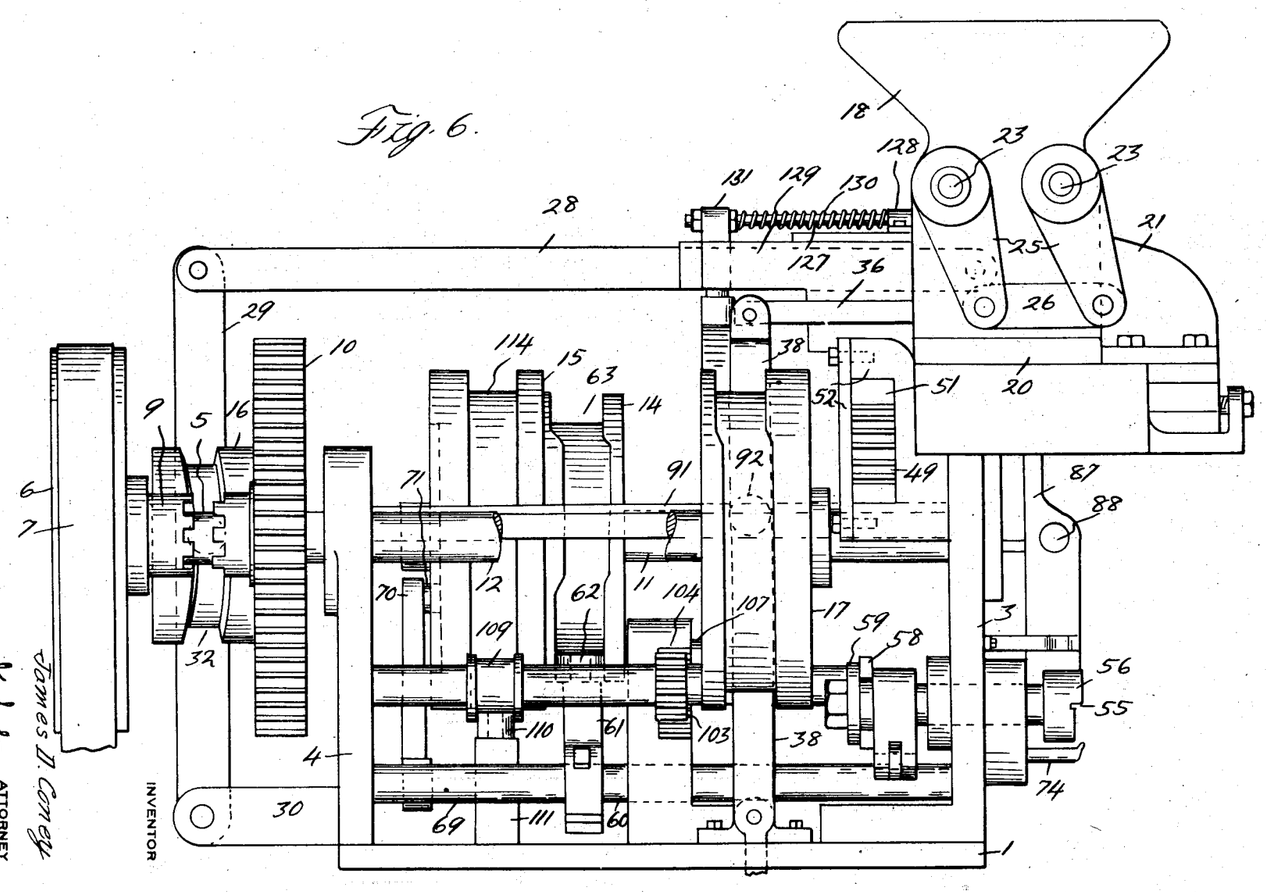
Fig. 6 is a right side view of the machine.
Figure 7:
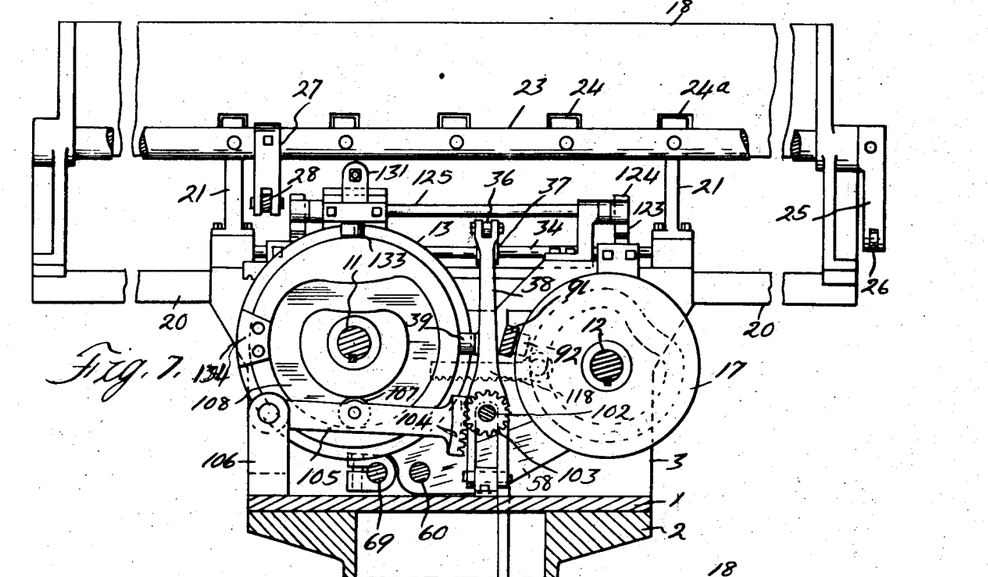
Fig. 7 is a cross sectional view taken upon the line VII—VII of Fig. 2, portions of the hopper being broken away.
Figure 8:
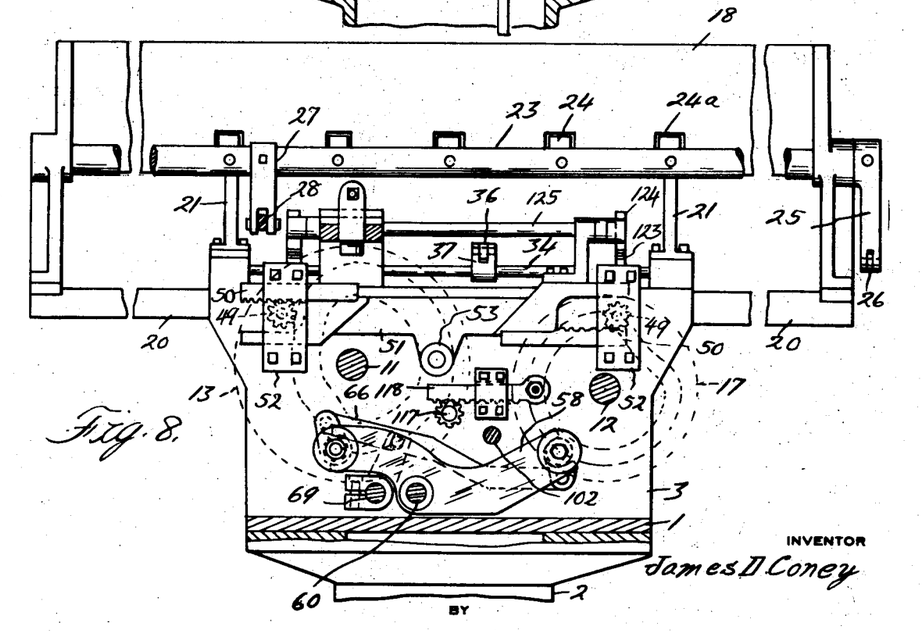
Fig. 8 is a cross sectional view taken upon the line VIII—VIII of Fig. 5, the hopper being again partly broken away.

Below the hopper 18 and in front of the plate 3, a pair of spaced parallel vertical plates 21, carried by the bracket arms 20, are correspondingly formed with elongated curved slots 22, opening at their upper ends slightly below the hopper outlet, as best appears in Fig. 5, and having a width permitting downward travel of the blanks 19 only in sequence. Said slots open rearwardly in the lower ends of the plates 21 and a provison for receiving blanks from said slots will be presently described.

A pair of spaced rock shafts 23 extend below and lengthwise of the hopper 18 forwardly and rearwardly of the outlet thereof, and each rigidly carries a plurality of sector-shaped blank feeders 24 projecting into the hopper through slots 24a in its side walls, the peripheral faces of said feeders being transversely serrated. Said feeders on the two shafts are spaced to afford the blanks downward travel only in sequence. At one end of the hopper, the shafts 23 rigidly carry a pair of arms 25, linked together as indicated at 26 to adapt said shafts to rock in unison. At the other hopper extremity, an arm 27 fast on one of the shafts 23 is pivotally engaged by the forward end of a link bar 28, extending to the rear end of the machine and there pivotally connected to the upper end of a rock arm 29, having its lower end fulcrumed on a bracket 30 rearwardly projecting from the table 1. (See Fig. 5.) The mid portion of said rock arm carries a roller 31, engaging in a cam groove 32 peripherally formed in the cam 16, and designed to continuously rock the arm 29 forward and back, once for each revolution of the shaft 11. Thus the shafts 23 and blank feeders 24 are continuously rocked during operation of the machine, so as to agitate the blanks in the lower portion of the hopper and deliver the same to the slots 22 in proper superposed relation.

From the feed slots 22 the blanks 19 are adapted to be delivered downwardly, one by one, by a pair of sector-shaped carriers 33 mounted fast upon a rock shaft 34 rearwardly of the guide plates 21. Said carriers are peripherally formed with a pair of aligned notches 35 proportioned to receive a single blank 19, when registered with the slots 22. (See Fig. 5.) As said carriers are rocked downwardly from their loading positions, the blank which they carry is retained in the notches 35 by substantial engagement of the notched edges of said carriers with corresponding concaved rear edges upon the lower portions of the plates 21. The lower limiting positions of the carriers 33 are illustrated in Fig. 5a.

Actuation of the shaft 34 is effected through a link bar 36 extending from an upstanding arm 37 on said shaft to an upstanding arm 38, pivoted upon the table 1 between the shafts 11 and 12 to rock forwardly and back. A roller 39 carried by the mid portion of the arm 38 engages a cam shoulder 40 which is continuous about the periphery of the cam 13, the blank carriers being thus actuated during predetermined portions of each revolution of the shaft 11. The lower end portion of the arm 38 is forked to straddle a shaft hereinafter described, and one fork of said arm extends down through a slot in the table 1 and is engaged by a coiled spring 41 to hold the roller 39 pressed against the cam shoulder 40. (See Fig. 11.)

*Shoulder-forming dies and their operating mechanism. (See Figs. 1, 4, 8, 9, 13, 14, and 15)*

In their lowermost position, the blank feeders 24 are adapted to deliver a blank 19 at the commencement of each operating cycle to a pair of shoulder-forming die blocks 43, mounted in spaced horizontally aligned relation on the front face of the plate 3, and formed with aligned blank-receiving grooves 44. The remote ends of said blocks are rounded below said grooves as indicated at 45, for coaction with rotary bending dies comprising pins 46 on the free ends of rock arms 47. Said pins as shown in dash lines in Fig. 1, lie above each blank 19 as it is delivered to said die blocks and, immediately following such delivery, the arms 47 are downwardly rocked, acting through said pins to bend the blanks about the rounded die heads 45, as appears in Figs. 1, 13, 14, and 15. Thus, the arms 47 are fast on a pair of parallel shafts 48 journaled in the mounting plate 3 and carrying pinions 49 at the rear of said plate. (See Fig. 16). Said pinions are engaged by racks 50 formed upon the forked end portions of a bar 51 slidable transversely of the machine in guides 52 upon the plate 3. (See Figs. 8 and 9). A downward extension from the mid portion of said slide bar mounts a roller 53, which engages in an endless cam groove 54 formed in the front face of the cam 13, whereby actuation of the bending dies 46, 47 is effected and properly timed in the cycle established by a revolution of the shafts 11 and 12. It is to be noted that said bending dies are not afforded a continuous downward travel but that such travel is momentarily interrupted to permit an offsetting operation upon the blanks, as will now be described.

*Provision for forming offsets in sides of hanger to conform to coat collar. (Figs. 8, 9, 12, 13, 14, and 16)*

The end portions of the blanks after having been bent through angles somewhat in excess of ninety degrees (see Fig. 13), are momentarily halted in registration with approximately diametrical slots 55 formed in a pair of circular die heads 56, which are similarly centrally mounted on the forward ends of shafts 57 horizontally journaled in the plate 3, and also reciprocatory therein.

Upon such registration, the shafts 57 are subjected initially to a slight forward actuation sufficient to engage the embryo hanger in said slots. Thus, said shafts are connected rearwardly of the plate 3 by a yoke bar 58 having forked extremities straddling grooved collars 59 on said shafts, as best appears in Figs. 8, 9, and 16. Said yoke bar is mounted fast upon a shaft 60 journaled in the plates 3 and 4 adjacent to the table 1, being thus reciprocatory by said shaft. Fast upon said shaft is an upstanding arm 61 journaling at its upper end a roller 62 engaged in an endless groove 63 peripherally formed in the cam 14, whereby the shaft 61 is moved forwardly and back during predetermined portions of each revolution of the shaft 11.

For rotating the die heads 56, a pair of arms 64 and 65 are formed integrally with the collars 59, extending respectively upwardly and downwardly, their free ends being linked together by a bar 66, carrying upon its mid portion a pin 67 engaged by the forked upper end of an arm 68 fast upon a rock shaft 69. (See Figs. 8, 9, and 16). The latter is journaled in the plates 3 and 4 adjacent to the table 1, and its rear portion carries an upstanding rock arm 70 having upon its free end a roller 71 engaging in an endless cam groove 72 formed in the rear face of the cam 15 (see Fig. 12). Thus, after each forward actuation of the die heads 56, the arm 68 is adapted to be rocked to a predetermined extent such as to cause said heads to form on a blank the offsets 73 indicated in Fig. 14. During this operation, the portions of the blank below the heads 56 are restrained from outward movement by pins 74 forwardly projecting from the mounting plate 3, as best appears in Fig. 16.

Figures 15, 16, 17:
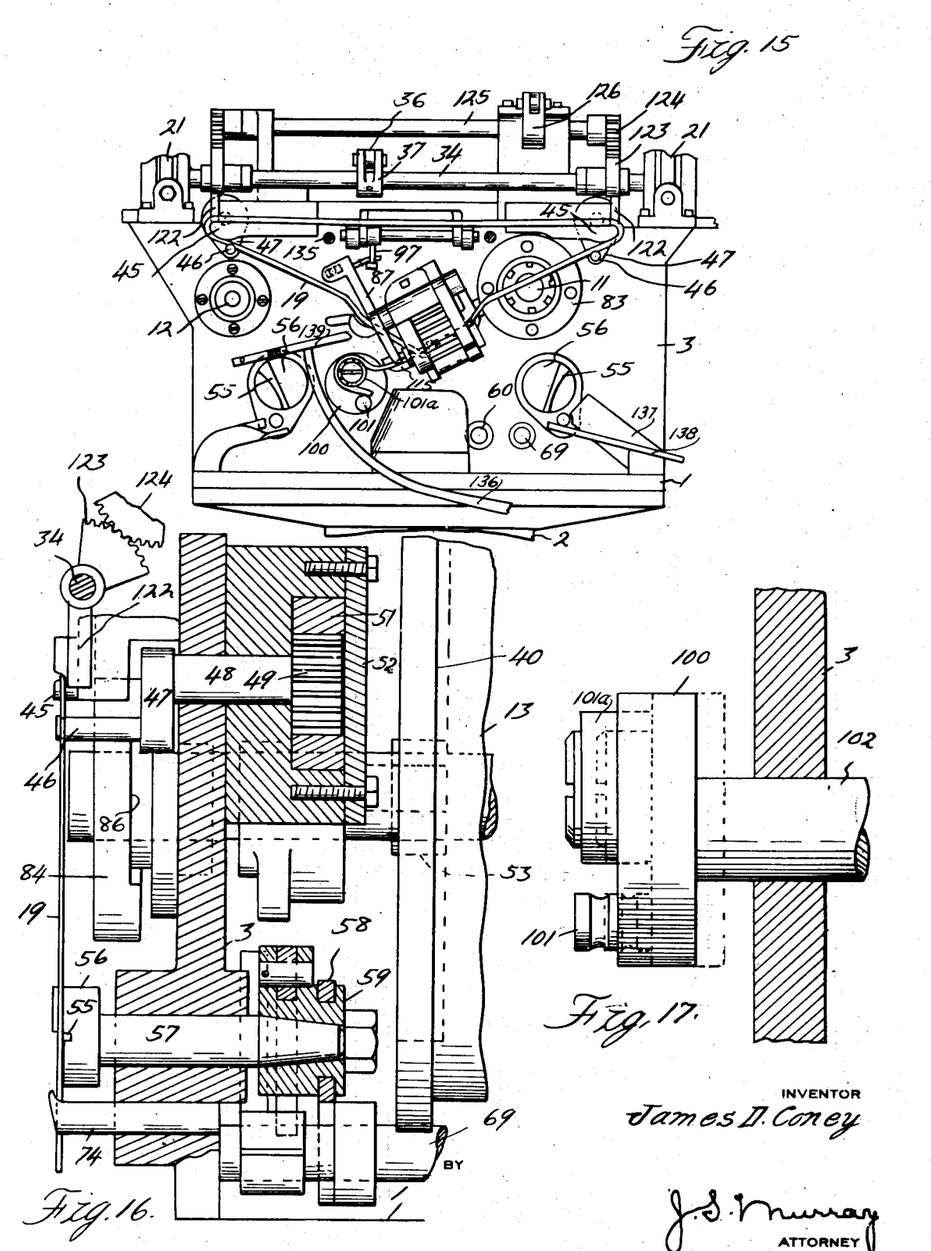
Fig. 15 is a similar view showing the side-bending operation completed, and the operations of connecting the sides and terminally forming one thereof with a hanger hook also completed.
Fig. 16 is a fragmentary longitudinal vertical section, taken upon the line XVI—XVI of Fig. 1 and primarily disclosing the instrumentalities for downwardly bending the side-forming portions of a blank and for forming the same with offsets.
Fig. 17 is a fragmentary longitudinal sectional view disclosing a hook-forming rotary die.
Figure 18:
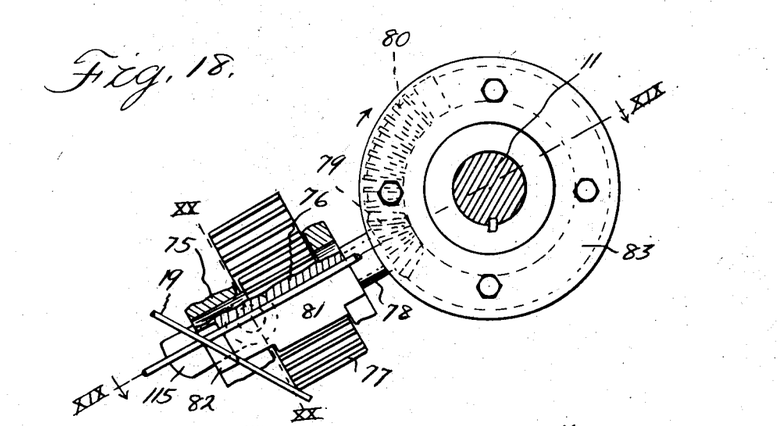
Fig. 18 is a front view of the gear and associated parts employed to loop one side of an embryo hanger about the other side thereof.
Figures 19, 20, 28:
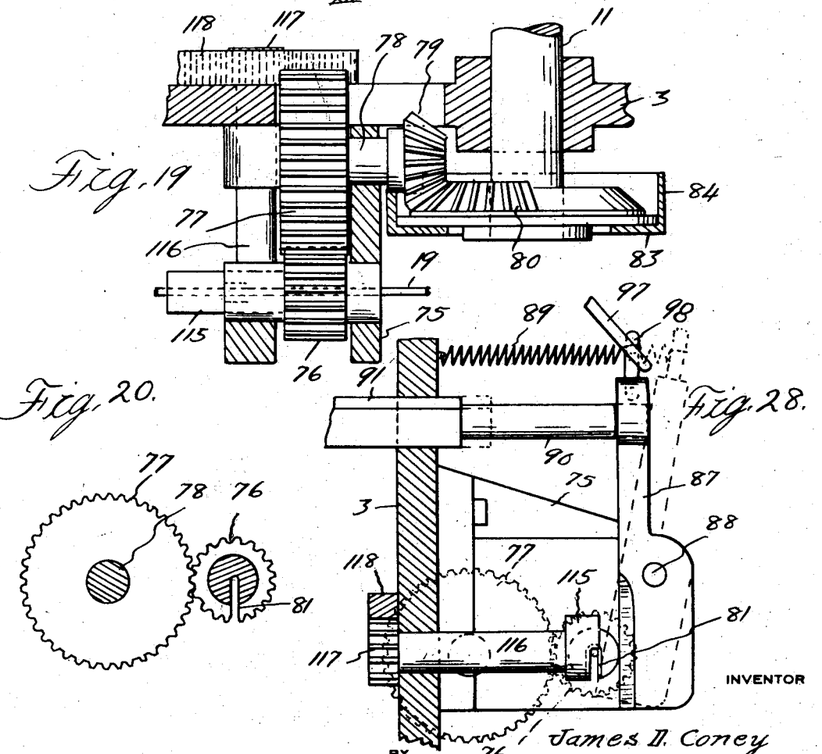
Fig. 19 is a sectional view of the same, taken upon the line XIX—XIX of Fig. 18.
Fig. 20 is a relatively transverse sectional view of the same, taken upon the line XX—XX of Fig. 18.
Fig. 28 is a fragmentary section taken upon the line XXVIII—XXVIII of Fig. 1, and showing primarily a clamp for holding the embryo hanger in place during connection of its end portions.

Immediately upon completion of said offsets, the cam groove 63 retracts the slotted heads 56, and bending of the end portions of the blank toward each other is continued to establish their positions illustrated in Fig. 15.

*Mechanism for connecting down turned portions of blanks. (Figs. 1, 4, 13, 14, 15, 15a, 18–21)*

Mounted substantially centrally upon the front face of the plate 3 is a bearing member 75 in which is journaled a pinion 76, driven by a larger pinion 77, fast upon a shaft 78 journaled in said bearing member rearwardly of the pinion 76. Said shaft carries upon one end thereof a beveled pinion 79 adapted to mesh with and be driven by a mutilated bevel gear 80, fast upon the shaft 11 in front of the plate 3. The teeth of said gear are formed upon a sector thereof, preferably measured by ninety degrees. Thus during the major portion of each revolution of the shaft 11, the gear train 79, 77, 76 is adapted to remain stationary, while during the remaining portion of such revolution the gear teeth mesh with and drive said pinion. The spur pinion 76 is formed between two adjacent teeth thereof with a longitudinal slot 81 extending to the axis of said pinion, and opening downwardly during the periods of rest of said pinion. Thus, during the final bending travel of the blank end portions, the longer thereof is adapted to upwardly enter the slot 81 to assume a position axial to the pinion 76. At the same time the shorter end portion of the blank is adapted to upwardly enter a notch 82 formed in one of the trunnions of the pinion 76 in the end face thereof, intersecting the slot 81. Immediately upon establishment of the crossed relation of the end portions of the blank, shown in Fig. 15, a drive is established to the pinion 76, whereby the shorter of said end portions forms one or more loops 82a about the longer portion as also appears in Fig. 15.

Figures 21, 22, 29, 30:
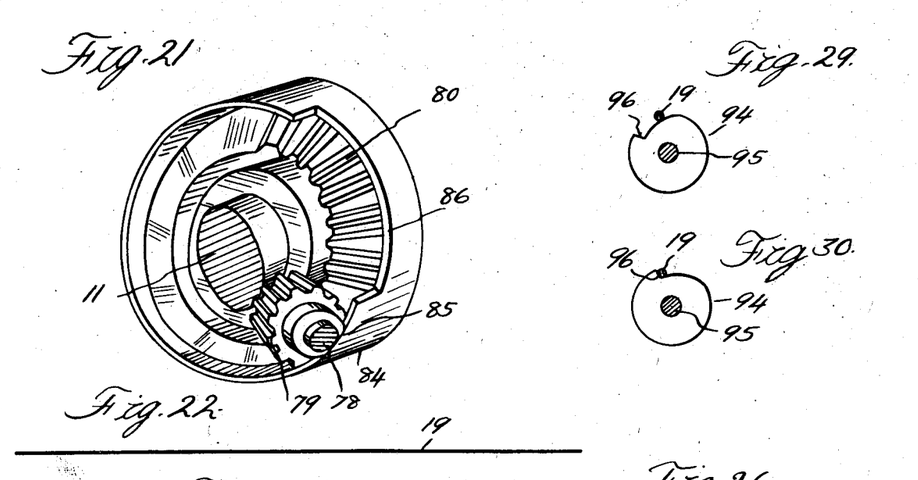
Fig. 21 is a perspective view of a pair of gears appearing in Figs. 18, 19 and 20, showing primarily a provision for holding one of said gears from rotation during a predetermined travel of a companion gear.
Figs. 22 to 27 inclusive diagrammatically illustrate different operations in transforming a wire blank into a garment hanger.
Fig. 29 is a detail section taken upon the line XXIX—XXIX of Fig. 14 showing one of a pair of pawls for clamping the top portion of the embryo hanger during connection of its ends, the normal or released position of said pawl being shown.
Fig. 30 is a similar view showing the clamping position of said pawl.
Figure 23:
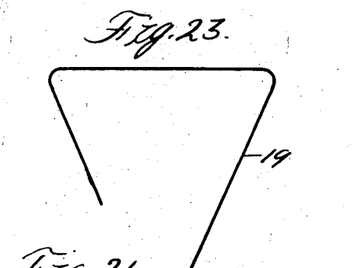
Figure 24:
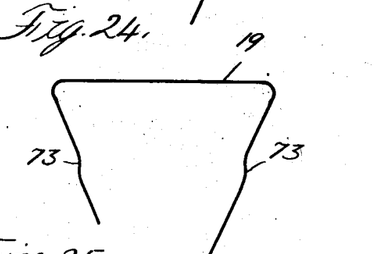
Figure 25:
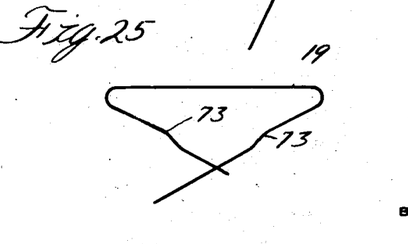
Figure 26:
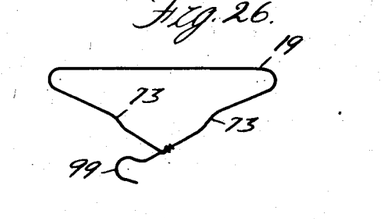
Figures 27, 31:
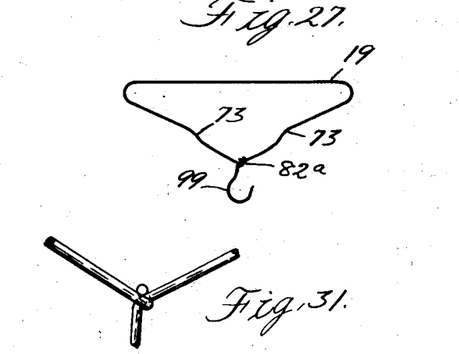
Fig. 31 is a fragmentary perspective view, showing a type of hanger having a single loop connection between its end portions.

It is essential to definitely maintain the downwardly opening position of the slot 81 during periods of rest of the pinion 76, and, as illustrated, this is accomplished by securing to the front face of the gear 80 a plate 83 having annularly flanged, as at 84, to peripherally surround the gear and adapted, as best appears in Fig. 21, to engage a flattened lateral face 85 upon the hub of the bevel pinion 79, when the untoothed portion of said gear is traveling past said pinion. When the gear teeth are meshing with said pinion a portion 86 of the flange 84 of reduced depth allows the pinion 79 to rotate fully.

It is further necessary to rigidly clamp the short end portion of the wire blank firmly against the long end portion thereof during formation of the loops 82a, and this is accomplished by an arm 87 pivoted at 88 upon the bearing member 75 and having its lower end normally spaced slightly forward from the axis of the pinion 76 by a spring 89 extending to the plate 3 from the upper end of said arm. Said end lies adjacent to the plate 3 and is engageable by a pin 90 slidable in said plate and formed upon the forward end of a bar 91, the rear end portion of which engages a slide bearing in the plate 4. A roller 92 laterally journaled upon said bar engages in an endless cam groove 93 peripherally formed in the cam 17 whereby during predetermined portions of each revolution of said cam, said bar is shifted forwardly and back. In its forward position, said bar acts through the pin 90 to rock the arm 87 and firmly clamp the shorter end of the blank against the longer portion thereof, close adjacent to the crossing of said ends.

The considerable stresses arising through formation of the loops 82a have some tendency to disengage the top portion of the embryo hanger from the die blocks 43, and to counteract such tendency, a pair of pawls 94 are so spaced upon a shaft 95 as to adapt radial shoulders 96 on said pawls to be rocked into restraining engagement with the upper position of the embryo hanger during formation of the loops. This is preferably accomplished by mounting on said shaft a pin 97, depending in front of a pin 98 laterally projecting from the upper end of the arm 87, so that rocking of the clamping arm also rocks the shaft 95.

*Hook forming instrumentalities. (Figs. 7, 12, 15, 16, and 17)*

A feature of the described machine tending to rapid production is the formation of the hangar hook 99 concurrently with interconnection of the blank end portions. Thus, as the loops 82a are being formed, as above described, a circular die head 100 is first actuated sufficiently forward to engage the long end portion of the blank between rollers 101 and 101a on said head, is then rotated to cause the smaller roller 101 to bend said end portion to a hook shape upon the larger roller 101a, and is finally again retracted to clear the hook so formed. The head 100 is carried by the forward end of a shaft 102 mounted in the plates 3 and 4 for both a rotative and reciprocatory actuation. Rotation of said shaft is effected by engagement of a pinion 103 thereon, by a quadrant gear 104 carried by the free end of an arm 105, pivotal at its other end upon a bracket 106 carried by the table 1. Said arm lies below the shaft 11, as best appears in Fig. 7, and at an intermediate point carries a roller 107 engaging in an endless cam groove 108 in the rear face of the cam 13. Said groove is designed to effect a hook-forming rotation of the shaft 102 and head 99 during a predetermined portion of the machine cycle, while holding said shaft and head stationary at other times.

Figures 9, 10, 11, 12:
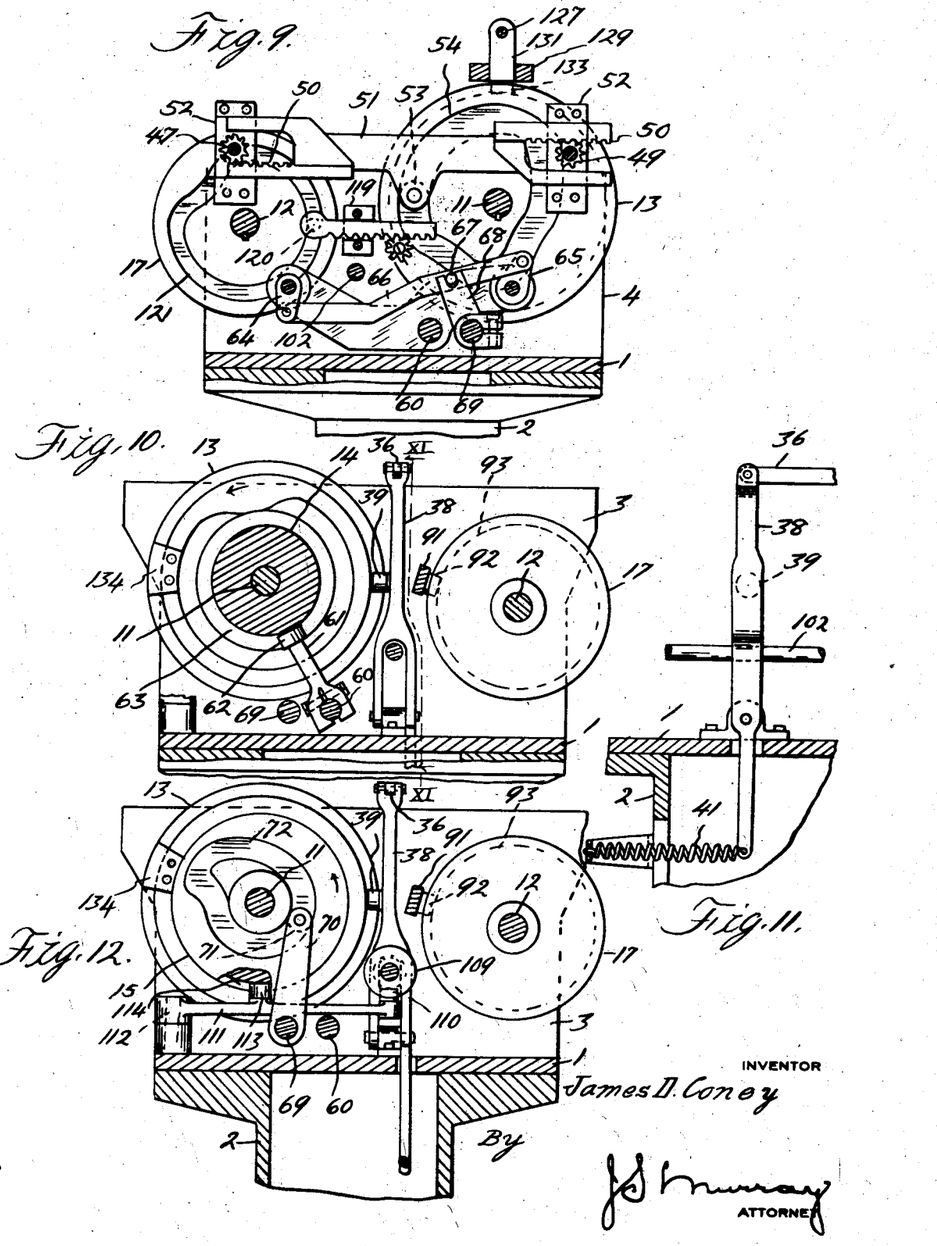
Fig. 9 is a cross sectional view taken upon the line IX—IX of Fig. 5.
Fig. 10 is a cross sectional view taken upon the line X—X of Fig. 2 and omitting the hopper mechanism.
Fig. 11 is a fragmentary longitudinal vertical section taken upon the line XI—XI of Fig. 10.
Fig. 12 is a cross section of the machine on the line XII—XII of Fig. 2, omitting the hopper and associated parts.
Figure 13:
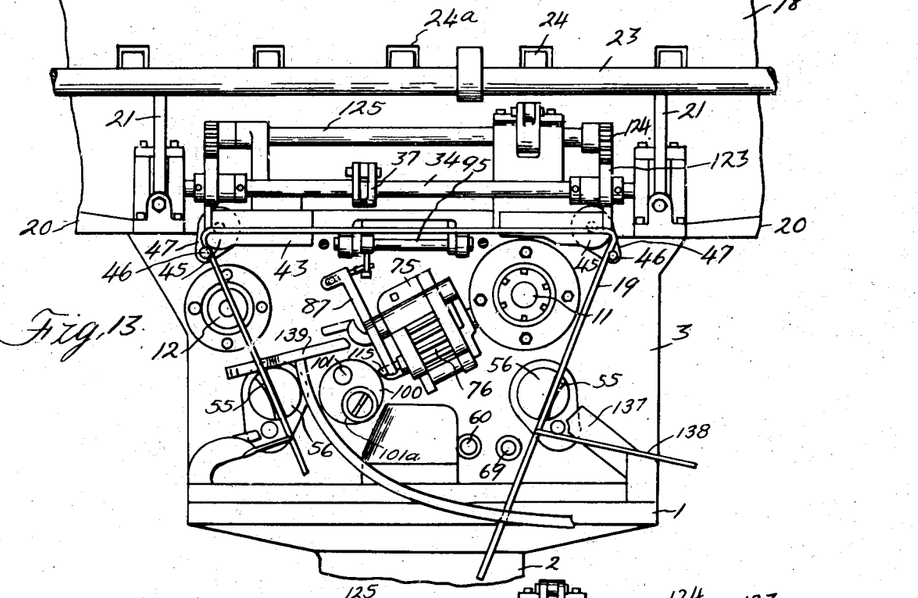
Fig. 13 is a fragmentary front view of the machine disclosing an embryo hanger in position for formation of offsets in its sides.
Figure 14:
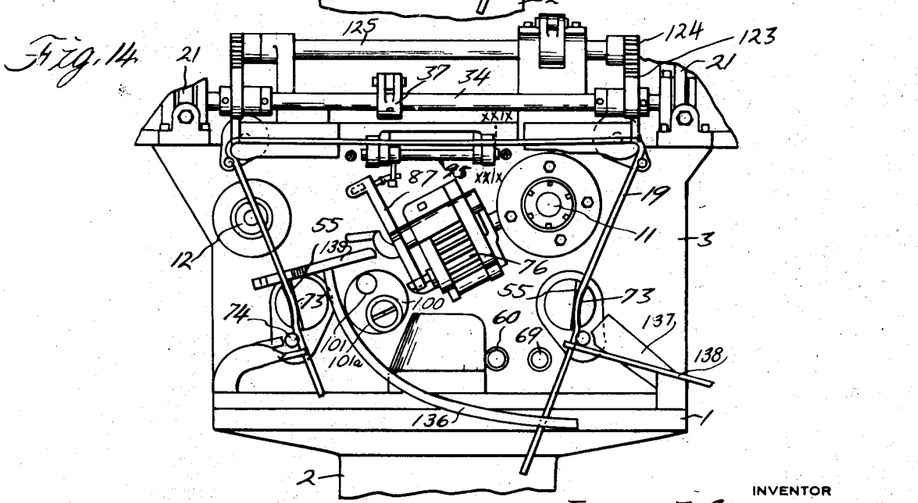
Fig. 14 is a similar view with the offset-forming operation completed.

To reciprocate the shaft 102 and head 99, a grooved collar 109 on said shaft is engaged by a roller 110 carried by the free end of an arm 111 extending beneath the shaft 11 substantially transversely thereto and pivoted at its other end as indicated at 112 (see Fig. 12). Said arm intermediately carries a roller 113, which engages in an endless cam groove 114 peripherally formed upon the cam 15, said groove being designed to move the head 100 sufficiently forward to engage the long end portion of the wire between the rollers 101 and 101a and to maintain that engagement during formation of the hook 99, then effecting retraction of said head, whereupon the latter is rocked to its normal position.

Provision for bending hook shank

Completion of the hanger after formation of the loops 82a and hook 99 is effected by bending the hooked end portion of the blank adjacent to said loops downwardly and transversely to the mid portion of the hanger. This operation is accomplished by an arm 115 fast upon a shaft 116 journaled closely adjacent to the pinion 76 in the plate 3. Rearwardly of said plate, a pinion 117 upon said shaft is engaged by a rack bar 118 slidable transversely of the machine in a bearing 119 carried by the plate 3 on its rear face. The rack bar 118 carries a roller 120 engaging in an endless cam groove 121 formed upon the front face of the cam 17, whereby the latter reciprocates said rack in proper timed relation to the other mechanisms. Thus, the arm 115 is downwardly bent upon completion of the loop and hook forming operations to centrally position the hook below the angle formed by the connected sides of the hanger.

Ejecting means

Immediately upon its completion, the hanger is ejected from the machine by a pair of rock arms 122 (see Fig. 16), freely pivoted on the shaft 34 and integrally formed above said shaft with segmental pinions 123 fast upon an overlying shaft 125, carrying an upstanding actuating arm 126. The latter is pivotally engaged by the forward end of a plunger 127 sliding in a bearing 128 surmounting a rearward projection 129 on the plate 3 (see Fig. 4), and a spring 130, compressed between said bearing and a block 131 on the rear end of said plunger normally maintains the latter retracted. The block 131 projects downwardly from said plunger and through its engagement in a slot 132 of the projection 129 guides the plunger in its reciprocation. The lower end of said block 131 carries a roller 133 which at the proper moment is engaged by a triangular cam projection 134 peripherally carried by the cam 13 to shift said plunger forward and eject the completed hanger. When its upper portion is thus disengaged from the die blocks 43, the hanger drops sufficiently to disengage its lower portion from the pinion 76, being then free to slide forwardly on a pair of spaced rods 135 carried by the plate 3 and projecting forwardly therefrom at a slight downward inclination.

Elements for guiding blanks in their bending travel. (See Figs. 1, 4, 13, 14, and 15)

As the longer end portion of a blank is bent down about the die head 45, said end portion enters between a pair of spaced guide bars 136 which extend across the front, lower portion of the plate 3. The entrance-forming ends of said bars are substantially horizontal and are spaced apart somewhat in excess of the main bodies of said bars to facilitate initial engagement of the wires in the guide way formed by said bars. The entrance ends of the latter are adjacent the left hand side of the machine and said bars are curved gradually upward in extending toward the other side of the machine. Said bars assure such a bending travel of the longer end portion of the blanks as will permit said end portions to accurately enter the slot 76.

Pairs of guides 137 and 138 further engage the long end portions of the blanks as they approach the offset-forming die heads 56 and insure proper positioning of said end portions for engagement by said heads.

The shorter end portions of the blanks are further engageable with guide arms 139 which assist in establishing proper positions of said end portions for engagement by the hook-forming die heads 100.

The preceding description of the machine and separate explanation as to the operation of its various parts is believed to render unnecessary any review of the complete operation.

It is to be noted, however, that the described machine is economical of floor space by virtue of the compact form, of its mechanism, and that said mechanism is considerably simplified as compared to prior machines for producing articles of the same general character.

Said machine furthermore produces garment hangers more rapidly than such prior machines and achieves a desirable economy of wire in forming such hangers.

While it will be apparent that the illustrated embodiments of my invention are well calculated to adequately fulfill the objects and advantages primarily stated, it is to be understood that the invention is susceptible to variation, modification and change within the spirit and scope of the subjoined claims.

What I claim is:

1. In a hanger forming machine, means for bending the end portions of a wire blank to a crossed relation, means for simultaneously looping one of said end portions about the other and terminally fashioning a supporting hook upon the last mentioned end portion, and means for bending the hook end portion closely adjacent to said loop, transversely to the mid portion of said blank.

2. In a wire forming machine, a pair of spaced substantially vertical plates similarly formed with slots having inlets and outlets respectively in their upper and lower portions, means for delivering wire blanks to said inlets, a pair of blank carriers correspondingly notched to jointly receive a single blank from the outlets of said slots, said plates being fashioned to retain said blank in said notches during downward actuation of said carriers, and means for rocking said carriers from registration with said slots downwardly to a blank-delivery position.

3. In a wire forming machine, a shaft, a pair of segmental blank carriers spaced apart upon said shaft and peripherally formed with aligned notches for jointly receiving a single wire blank, means for singly delivering wire blanks to said notches in one position of said carriers, bending dies adapted to successively receive blanks from said carriers in another position of the carriers, means for rocking said shaft to alternately establish said positions of said carriers, and means for retaining said blank in said notches during travel of said carriers toward said dies.

4. In a hanger forming machine, a pair of forming dies having aligned grooves, and having rounded die heads at their remote ends, means for delivering a wire blank into the grooves of said dies, means for bending the end portions of a blank about said die heads to a crossed relation, means for interconnecting said end portions at their crossing, and means for fashioning one of said end portions with a support.

5. In a hanger forming machine, a pair of fixed die heads, a pair of coacting bending dies rotatable about the axes of said heads to bend a wire blank correspondingly about said heads, a pair of shafts respectively carrying said rotatable dies, pinions on said shafts, a slide bar terminally carrying a pair of racks engaging said pinions, and means for reciprocating said slide bar.

6. In a wire forming machine, a pair of rotary wire bending dies, a coacting pair of fixed bending dies, a pinion connected to each rotary bending die, a slide bar, racks upon said bar engaging said pinions, a drive roller carried by said bar, a cam having a side face thereof grooved to receive said roller, and means for rotating said cam.

7. In a hanger forming machine, means for bending the end portions of a wire blank to a crossed relation, a pair of grooved rotary dies, with which said end portions are registrable in the course of said bending, means for shifting said dies axially to engage said end portions in said grooves, means for rocking said dies in unison to form offsets in said end portions, means for connecting said end portions at their crossing, and means for fashioning a support on one of said end portions.

8. In a wire working machine, a rotary die member, a pair of shafts parallel to the axes of said member, means for reciprocating one of said shafts, means connecting said shaft to said die member to advance and retract the latter through reciprocation of said shaft to engage and disengage a wire blank, means for rocking the other of said shafts, and an actuating connection from the last mentioned shaft to said die member for rocking the latter in unison with said shaft.

9. In a hanger forming machine, means for bending end portions of a wire blank to a crossed relation, a pinion slotted longitudinally to receive one of said crossed end portions at its axis, means for rotating said pinion to twist the other end portion about the first mentioned end portion, and means for forming a supporting hook upon the first mentioned end portion.

10. In a wire working machine, the combination with means for establishing a diagonally crossed relation between two portions of wire length, of a pinion formed with a longitudinal radial slot adapted to receive one of said end portions in the crossed position of said end portions, means for rotating said pinion to loop the end portion passing through said slot about the end portion axially engaged in said slot, and a mutilated gear adapted to establish a periodic drive to said pinion.

11. In a hanger forming machine, means for bending unequal end portions of a wire blank to a diagonally crossed relation, means for spirally looping the shorter of said end portions about the longer thereof, means for terminally fashioning a support upon the longer of said end portions, means for bending the end portion, thus fashioned, closely adjacent to said loop, transversely to the mid portion of the blank, and mechanism for actuating each of the specified means in a predetermined timed relation.

12. In a hanger forming machine, means for holding a wire blank in a substantially horizontal position, means for bending unequal end portions of said blank correspondingly downward and toward each other to a diagonally crossed relation, whereby the longer end portion projects beyond the crossing of the two end portions to form a hook and a shank for said hook, means for terminally fashioning a supporting hook upon the longer end portion, means for establishing a substantially rigid connection between said end portions at their crossing, means for bending the hook shank downwardly at a point closely adjacent to said connection, to establish said shank substantially perpendicular to the mid portion of the blank, and mechanism for relatively timing the several specified operations.

13. In a hanger forming machine, a pair of spaced bending dies, means for delivering a wire blank to said dies, means between said dies for clamping said blank in engagement with said dies, means for bending unequal end portions of said blank about said dies to a crossed relation, means for fashioning a support terminally upon the longer of said end portions, means for establishing a connection between said end portions, substantially at their crossing, and means for bending the longer end portion, closely adjacent to said connection, transversely to the mid portion of the blank.

14. In a hanger forming machine, a pair of spaced bending dies, means for delivering a wire blank to said dies, a rotative member journaled between said dies and formed with a clamping shoulder engageable with said blank through rocking of said member, means for bending unequal end portions of said wire blank around said dies to a crossed relation, means for fashioning a support terminally upon the longer of said end portions, means for establishing a connection between said end portions substantially at their crossing, and means for bending the longer end portion, closely adjacent to said connection, transversely to the mid portion of the blank.

15. In a hanger forming machine, means for bending unequal end portions of a wire blank to a diagonally crossed relation, a member engageable by the shorter end portion in its crossed position relative to the other end portion, said member being rotative to loop the shorter end portion around the longer one, means holding the longer end portion fixed during such looping, means for fashioning a hook terminally upon the longer end portion, and means for bending the end portion, thus fashioned, transversely to the mid portion of the blank to provide a shank for said hook.

16. In a hanger forming machine, a pair of spaced bending dies, means for delivering a wire blank to said dies, means for bending unequal end portions of said blank about said dies to a crossed relation, means for subsequently fashioning a support on the longer of said end portions, means for establishing a connection between said end portions, and means for bending the support-forming end portion closely adjacent to said connection, transversely to the mid portion of the blank.

17. In a hanger forming machine, the combination with a rotatable member, formed with a radial slot extending to its axis of rotation, and from end to end of said member, of means for bending the end portions of a wire blank to cross said end portions closely adjacent to said member and to engage said end portions in said slot, one at the axis of said member and the other divergently to said axis, and means for rotating said member to loop the divergent end portion of the blank about the axial end portion thereof.

18. In a hanger forming machine as set forth in claim 17, clamping means engageable with said end portions at their crossing.

19. In a hanger forming machine, a pair of spaced bending dies, means for delivering a substantially straight wire blank to said dies, means for bending end portions of said blank about said dies to a diagonally crossed relation, means for intermediately offsetting each of said end portions in their common plane to conform said portions to the collar of a garment to be supported by the finished hanger, means for interconnecting said end portions substantially at their crossing, means for fashioning a support upon the longer of said end portions, and mechanism for actuating each of the specified means in a predetermined timed relation, and for momentarily interrupting bending travel of said end portions during their subjection to said offset-forming means.

20. A machine for forming hooked wire hangers, comprising a rotary hook-forming head, means for rotating said head and a pair of spaced projections upon said head, oppositely eccentric to the axis of rotation of said head, and adapted to receive between them the end portion of a blank to be fashioned with a hook, one of said projections being annularly grooved to receive said blank during formation of the hook.

21. A machine as set forth in claim 20, said projections each having the nature of a roller journaled upon said head to turn about an axis parallel to that of said head.

22. In a hanger forming machine, a pair of spaced bending dies, means for delivering a wire blank to said dies, means for bending unequal end portions of said blank about said dies to a diagonally crossed relation, means for interconnecting said end portions substantially at their crossing, means for forming a support terminally upon the longer of said end portions, ejector means operative upon the completed hanger substantially at the bends of its end portions, and mechanism for operating all of said means in a predetermined timed relation.

23. In a hanger forming machine, means for bending unequal end portions of a wire blank to a diagonally crossed relation, means for interconnecting said end portions substantially at their crossing means for forming a support on the longer of said end portions, and mechanism for operating said bending means and for operating said interconnecting means and hook-forming means simultaneously and in a predeterminedly timed sequence to the bending operation.

24. In a hanger forming machine, a fixed bending die, means for delivering a wire blank to said die, a rotary bending die coacting with said fixed die, a cam drum, means for continuously driving said cam drum, and drive mechanisms for said carrier and bending die, intermittently actuable by said cam drum.

25. In a wire working machine, a pair of spaced fixed bending dies, a pivotal carrier for individually delivering wire blanks to said dies, rotatable bending dies coacting with said fixed dies to bend the end portions of wire blanks around said fixed dies, a cam drum, means for rotatively driving said cam drum, and mechanisms intermittently actuable by said cam drum for driving said pivotal carrier and rotatable bending dies.

26. In a hanger forming machine, the combination with hanger forming means, of mechanisms for delivering wire blanks individually to said means and for individually ejecting completed hangers from the machine, a rotary cam drum, drive means for said drum, and actuating mechanisms for said delivering and ejector mechanisms intermittently driven by said drum.

27. In a hanger forming machine, mechanism for bending the end portions of a wire blank, mechanism for individually delivering blanks to said bending mechanism, mechanism for forming a support terminally on one of said end portions, mechanism for ejecting completed hangers individually from the machine, a cam drum, means for rotating the cam drum, means operable by said cam drum for intermittently actuating the several specified mechanisms in a predetermined timed relation, and means for connecting the end portions of each blank prior to ejection of the resultant hanger.

28. In a hanger forming machine, means for bending unequal end portions of a wire blank to a crossed relation, means for forming the shorter end portion with a loop embracing the longer one, and means for tensioning the longer end portion concurrently with formation of said loop.

29. In a wire working machine, mechanism for fashioning wire blanks, carriers for delivering the blanks individually to said mechanism, elements engageable with the fashioned blanks for ejecting them from the machine, actuating mechanisms for said carriers and ejector elements and a rotative cam drum peripherally effective on said actuating mechanisms to operate the carriers and ejector elements in a predetermined timed relation.

30. In a wire working machine, the combination with means for establishing a diagonally crossed relation between two end portions of a wire blank, of a pinion formed with a longitudinal radial slot adapted to receive said crossed end portions, one coincidently and the other divergently to the pinion axis, means for rotating said pinion to loop the divergent end portion about the axial end portion, and a mutilated gear adapted to establish a periodic drive to said pinion.

31. A machine for forming hooked wire hangers, comprising a rotary hook-forming head, means for rotating said head and a pair of spaced projections upon said head, oppositely eccentric to the axis of rotation of said head, and adapted to receive between them the end portion of a blank to be fashioned with a hook, said projections each having the nature of a roller journaled upon said head to turn about an axis parallel to that of said head.

32. In a wire working machine, the combination with means for establishing a diagonally crossed relation between two portions of a wire blank, of means effective upon one of the crossed portions to loop it about the other of said portions, means for holding the last-mentioned portion substantially straight during such looping, and mechanism for actuating each of the specified means in a predetermined timed relation.

33. In a hanger forming machine, the combination with a support, of means for definitely positioning a wire blank upon said support, a member rotatable on said support, means for bending unequal end portions of the positioned blank to establish the longer of said end portions in a coaxial relation with said rotatable member, and to extend the shorter end portion across the longer one adjacent to said rotatable member, and to position the free extremity of said shorter end portion in the path of said rotatable member beyond the crossing of said end portions, means for rotating the rotatable member to loop said extremity about the longer end portion, and means for holding the longer end portion substantially fixed during formation of such loop.

34. In a hanger forming machine, a support, means for positioning a wire blank upon said support, means upon said support for bending unequal end portions of said support in a substantially common plane to a diagonally crossed relation, a member rotatable upon said support, formed with a radial slot extending to the axis of said member, said slot, in one rotative position of said member, being adapted to receive the longer end portion, coaxially with said member, and to receive the shorter end portion, in a divergent relation to said axis, means for rotating said rotatable member to loop said extremity about the longer end portion, mechanism for actuating the several specified means in predetermined timed relation, and means for positively locking said rotatable member from rotation, during registration of its slot with the plane of bending of the end portions of the blank.

35. In a wire working machine, a rotatable member formed with a substantially radial wire-receiving groove extending approximately to its axis of rotation and from end to end of said member, means journaling said member, means for intermittently rotating said member and for establishing a definite rotative position of said member during its intermissions of rest, and means for engaging wires in said groove during said intermissions of rest.

36. In a wire working machine, a rotatable member formed with a wire-receiving groove, elongated from end to end of said member and extending substantially toward its axis of rotation, means journaling said member, means for rotating said member, and means for automatically interrupting rotation of said member upon a predetermined number of revolutions thereof.

37. In a wire-working machine, a rotatable member grooved from end to end from its periphery substantially toward its axis of rotation, means for journaling said member, means for engaging two strands of wire in the groove of said member, and means for rotating said member to interconnect said strands.

38. In a wire working machine, a rotatable member grooved from end to end, inwardly from its periphery, means for journaling said member, means for engaging two strands of wire in the groove of said member, means for rotating said member to interconnect said strands, means for holding the wires in a desired relation during their interconnection, the last-named means operating in timed relation to said means for engaging the wires in the groove.

39. In a wire working machine, the combination with a rotatable member grooved from end to end and inwardly from its periphery, means for positioning a strand of wire in said groove substantially at the axis of said member, means for positioning a second strand of wire in a diagonally crossed relation to the first strand, with a terminal portion of said second strand engaging in said groove, and means for rotating said rotatable member to loop the second strand around the first strand.

40. In a wire working machine as set forth in claim 39, means establishing a timed operating relation between each of the specified means.

41. In a wire working machine, a pair of pivotal arms movable about substantially parallel axes to establish two strands of wire in position for interconnection, a rotative member grooved from end to end thereof to receive said strands, as positioned by said arms, and means for rotating said rotative member to interconnect said strands.

42. In a wire working machine, means for bending a length of wire to effect a diagonal crossing of portions of said wire, means for twisting one of said portions about the other portion, means for maintaining the last named portion in rectilinear form during such twisting, and mechanism for operating said bending means and twisting means consecutively in a predetermined timed relation.

In testimony whereof I sign this specification.

JAMES D. CONEY.